W. BERMAN.
SECTIONAL INNER STRIP FOR AUTOMOBILE TIRES.
APPLICATION FILED JAN. 19, 1922.
1,423,748. Patented July 25, 1922.
Fig. A.
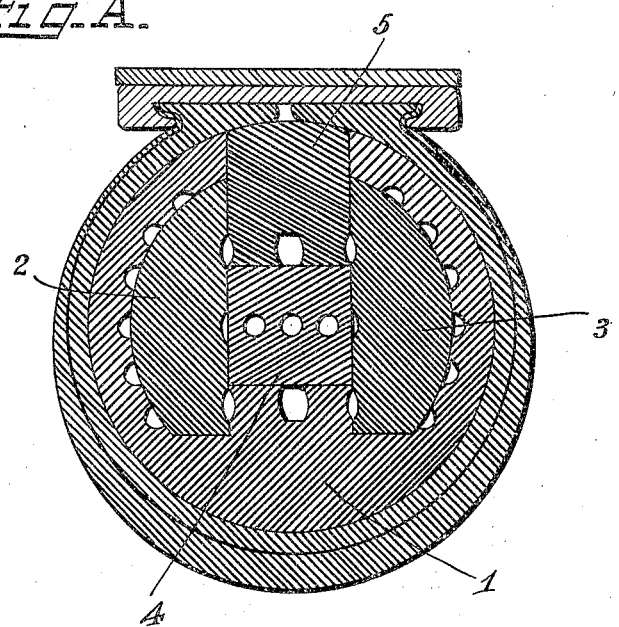
Fig. B.
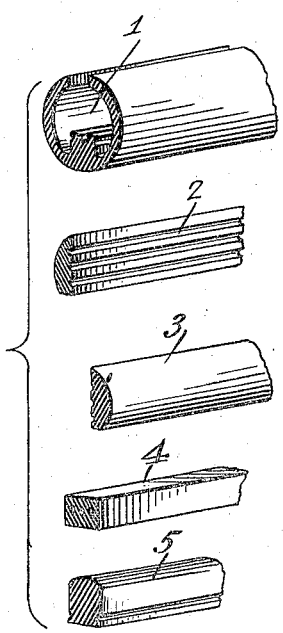
Inventor:
Wolf Berman

UNITED STATES PATENT OFFICE.

WOLF BERMAN, OF NEW YORK, N. Y.

SECTIONAL INNER STRIP FOR AUTOMOBILE TIRES.

1,423,748.  Specification of Letters Patent.  Patented July 25, 1922.

Application filed January 19, 1922. Serial No. 530,462.

*To all whom it may concern:*

Be it known that I, WOLF BERMAN, a citizen of the United States, residing in the city of New York, borough of Manhattan, county and State of New York, have invented new and useful Improvements in Sectional Inner Strips for Automobile Tires, which are made out of rubber and rubberized canvas, containing air channels which give the same resilience to automobile tires as pneumatic air tubes.

The object of my invention is to eleminate flat tires and blow-outs, and to make punctures harmless and at the same time assuring the same amount of resilience and yieldability as ordinary inner pneumatic air-tubes, and the following is a specification.

Composition and construction.

My invention is composed of sectional inner strips of flexible rubber and rubberized canvas molded together in their respective parts. These strips are so designed that when fitted, one part at a time, into the tire, their ends meet and form circumferential strips which run parallel within the tire. Each of said strips are constructed with air-channels which also run circumferentially and parallel within the tire, thereby allowing air at atmospheric pressure to circulate through these channels while the car is in motion. Said air-channels allow the easy yielding of the tire.

Ease of adjustment.

Sectional inner strips can be very easily fitted into automobile tires without mechanical capability because of their special design.

Figure A is a cross-section view which may be taken at any point throughout the tire, and this view portrays the various parts with their special designs.

No. 1 is the containing-strip. This part fits easily into the automobile tire and occupies its entire axial circumference. This containing-strip has an opening circumferentially parallel with, and at the opening at, the heel portion of the tire; said opening being there for the purpose of permitting the placing in and easy adjustment of the other sectional strips which are designed to fit within the containing-strip.

The containing-strip, which is fitted into tire first, has an opening space in which the balance of sectional inner-strips are to be placed, and is constructed with a thin rubberized canvas at its outer face, and this canvas extends from one side of opening across and covers part of the opposite side of said opening space, and holds all the sectional inner-strips in their proper places when the rim of the wheel is connected with the tire. On both side portions of the inner surfaces of this containing-strip, beginning from a point one inch away from the opening of this strip at the heel portions and the same distance from the bases at the tread portions, are series of grooves forming air-channels which serve two purposes, viz.: they make this member yieldable and furnish a supply of air. In the center of the tread portion is an extension designed with air-channels and projecting from the inside of the containing-strip to a point where it, along with the said air-channels, meets No. 4, the cushion-strip, and on both sides of said extension are other extensions of smaller proportions which form bases for Nos. 2 and 3, the supporting-strips. These parts are designed for the purpose of supporting the weight of the machine. They are oval-shaped at their outer faces and flat at the bottoms and inner faces. The supporting-strips are flattened at the tread portion and the container is raised at this point so as to form a more solid base. Furthermore, there are three grooves on the inside surfaces of the flat faces of these supporting-strips which are constructed opposite and close to the air-channels of parts Nos. 1, 4 and 5. These grooves are designed for the purpose of permitting all the parts of my invention to yield simultaneously and are composed of such a quality of rubber as to force back and retain all the parts in their respective and proper positions.

No. 4 is the cushion-strip. This part is composed of live rubber sandwiched between layers of rubberized canvas at heel and tread sides only and serves the purpose its name indicates—the purpose of a cushion or spring. Its being composed of live rubber sets this cushion-strip forth as being the most resilient member of the combination of various strips used in my invention. However, it is not merely a resilient member, but a yieldable one as well, because it is designed with three air-channels which run circumferentially parallel with and between aforesaid canvas layers of this strip.

No. 5 is the plug-strip. This part serves the same purpose as does an ordinary plug in so far as it is the last member to be fitted into its place, an operation which in itself plugs up and encloses and keeps all the other parts of my invention where they belong. This part is also designed with air-channels which rest against No. 4, the cushion-strip, in the same manner as the air-channels of No. 1, the containing-strip, and is rounded off at the heel portion in such a shape as to fill in the opening at the heel portion of the containing-strip, thereby forming one continuous cross-sectional circle as an ordinary pneumatic tube would form. This plug-strip is placed in through the opening at the heel portion of the containing-strip, as are the supporting-strips and cushion strip likewise placed in, and rests between the supporting-strips, the cushion-strip and the canvas projecting from one of the ends of, and at the opening at, the heel portion of the containing-strip.

Fig. B. illustrates all the five strips composing my invention as they look before being fitted into tire. Each strip, constructed with channels which contain air, is flexible, so that when fitted into a tire it shapes itself into its proper place and forms a perfect circle within the tire, as shown in Fig. A, and the air circulates in the channels with any movement of the automobile, thus furnishing same resilience as pneumatic air-tubes.

Although I have gone into a rather lengthy detail in an endeavor to elucidate the composition, design and merits of my sectional inner strips for automobile tires, I am prone to add that the operation of adjusting my invention within any tire is indeed a simple one consuming a good deal less time in its application than the pneumatic tire would consume in its being inflated to its required air-pressure with its susceptibility of "blowing out" if too highly inflated and with its great inclination to puncture by penetration.

*Note.*—My invention is now in its preferred form, but it is to be remembered that various changes in shape, size, arrangement and number of parts may be resorted to if expedient without departing from the spirit of the invention or the scope of the following claims.

I claim:

1. A combination of a containing-strip which fits into automobile tires in connection with two supporting-strips, one cushion-strip and one plug-strip, all of which fit within the containing-strip and are of special designs, each part containing air-channels which furnish yieldability, and all parts fitting snugly and securely within one another, and functioning as one unit.

2. A combination of a containing-strip which fits into automobile tires first, enclosing two supporting-strips, one cushion-strip and one plug-strip, each part constructed with air-channels retaining air permanently in the channels.

WOLF BERMAN.